United States Patent [19]

Whiteley et al.

[11] 4,220,952
[45] Sep. 2, 1980

[54] RANDOM FM AUTOCORRELATION FUZE SYSTEM

[75] Inventors: Thomas B. Whiteley, Corona; Donald J. Adrian, Arlington, both of Calif.

[73] Assignee: The United States of America as represented by the Secretary of the Navy, Washington, D.C.

[21] Appl. No.: 566,318

[22] Filed: Feb. 17, 1956

[51] Int. Cl.³ .................... F42C 13/04; G01S 13/34
[52] U.S. Cl. .................................. 343/7 PF; 102/214
[58] Field of Search ................... 343/7, 14, 7 PF; 102/70.2 P, 214

[56] References Cited
FOREIGN PATENT DOCUMENTS
724555 2/1955 United Kingdom .............. 343/14

Primary Examiner—Malcolm F. Hubler
Attorney, Agent, or Firm—Richard S. Sciascia; Joseph M. St. Amand

[57] ABSTRACT

1. An FM doppler fuze system comprising means for transmitting a signal having a carrier frequency modulated by a band of random noise, means for mixing the transmitted signal with a return echo signal modified by the doppler effect of the relative movement between the fuze and a target, and means for deriving an output adapted to actuate the fuze from the low frequency doppler portion of the output from said mixing means.

5 Claims, 5 Drawing Figures

RANDOM FM AUTOCORRELATION FUZE SYSTEM

The invention described herein may be manufactured and used by or for the Government of the United States of America for governmental purposes without the payment of any royalties thereon or therefor.

This invention relates to a fuze system and more particularly to a random FM autocorrelation fuze system wherein the transmitted frequency is frequency modulated by band limited random noise to provide rapid unambiguous range cutoff in the doppler signal obtained by mixing the transmitted signal with the delayed return signal and filtering and rectifying the output.

In this type of frequency modulated doppler fuze system, a sinusoidal frequency modulation has been utilized to give some range attenuation but the cutoff is very poor and ambiguous due to the periodic modulation.

In the fuze system of the present invention a white noise source is utilized to provide a substantially uniform frequency band of noise at random frequencies which is passed through a band pass filter and used to frequency modulate the carrier frequency which is transmitted in the direction of the target. A portion of the transmitted signal is mixed with the return signal received from the target, the latter being phase modulated by the doppler effect of the movement between the missile and the target. The output of the cosine law mixer provides the autocorrelation function of the power spectrum which is then passed through a low pass filter which transmits the doppler frequency output. The doppler output is then used to trigger the fuze with suitable delay provided as desired. The doppler frequency output of the cosine law mixer in the low pass filter is substantially zero until the missile closely approaches the target at which time the output rapidly increases to a maximum and there are no ambiguous peaks of signal amplitude at different ranges to give undesirable response of the fuze as in the case of periodic modulation, that is, the range response is not periodic.

One object of the present invention is to provide a fuze system having a rapid and unambiguous range cutoff.

Another object of the present invention is to provide a doppler fuzing system which uses random FM carrier autocorrelation for range cutoff and utilizes a mixer and filter to perform this autocorrelation.

A still further object of the present invention is to provide a fuzing system which can be utilized in close proximity to a surface such as the ocean without receiving spurious signals which will trigger the fuze prematurely.

Still another object of the present invention is to provide a modulated FM doppler type fuze having extremely good counter-countermeasure properties, since it is very difficult, if not impossible, to jam with any signal which is correlated with the transmitted signal to provide a simulated fuze response.

Other objects and many of the attendant advantages of this invention will be readily appreciated as the same becomes better understood by reference to the following detailed description when considered in connection with the accompanying drawings wherein.

Figure 1:
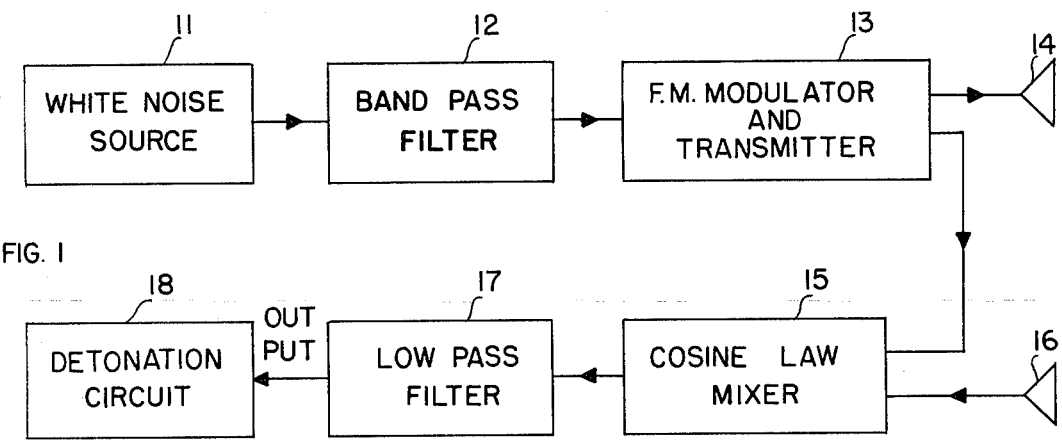
FIG. 1 is a block diagram illustrating one preferred embodiment of the present invention.

Referring now to the drawings in detail, one preferred embodiment of the present invention is shown in block diagram form in FIG. 1. The fuze is assumed to be mounted in a moving missile which is guided in a path to approach the target with the RF energy from the fuze being transmitted toward the target and a return echo signal being received therefrom.

A white noise source 11 provides a continuous uniform spectrum of random frequency noise which is passed through a band pass filter 12. The filter 12 is not critical with respect to the portion of the frequency spectrum passed or the width of the band which is passed. Experimentally, various frequency bands between 20 kc and 10 megacycles have been utilized with a band width varying from 10 kc to 10 megacycles.

The band of white noise which is passed through the filter 12 is utilized to modulate the RF carrier frequency in the FM modulator and transmitter 13 which transmits the noise modulated FM signal in the direction of the target through the antenna 14. A portion of the transmitted energy is also applied to the cosine law mixer 15 where it is combined with the return signal from the target aircraft which has been modified by the doppler effect of the relative movement between the missile and aircraft and is received through the antenna 16 and applied to the cosine law mixer.

Figure 4:
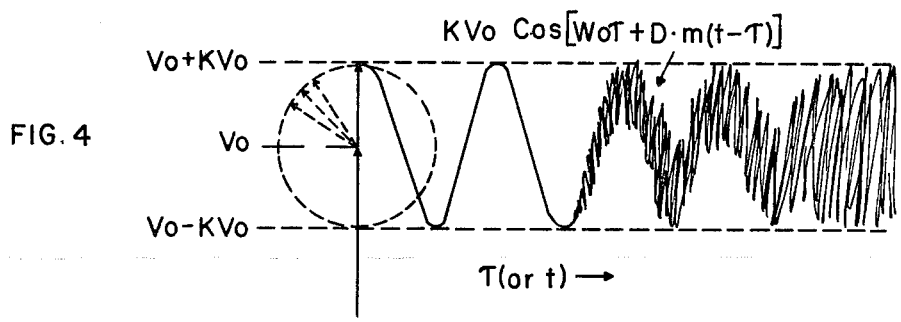
FIG. 4 is a diagram illustrating the nature of the output from the cosine law mixer before it is averaged by passing through the low pass filter.

The modulation of the carrier frequency by the band of white noise having a uniform frequency distribution between the limits of the band and a relatively sharp cutoff at the ends of the band results in a Gaussian power spectrum. The output from the cosine law mixer 15 is passed through a low pass filter 17 which is set to pass all the expected doppler frequencies. Since a mathematical analysis of a cosine law mixer using angle modulated inputs will demonstrate that the low frequency portion of the output is proportional to the autocorrelation function of the modulated input and because of the well known relation between the autocorrelation function and the power spectrum in accordance with Weiner's theorem, the output signal is a doppler wave having an envelope of a form $e^{-K_1 \tau^2}$ or $e^{-K_2 d^2}$ where $\tau$ is the time for the transmitted signal to travel to the target and back and d is the distance to the target as illustrated in FIG. 4. $K_1$ and $K_2$ are suitable constants.

Figure 3:
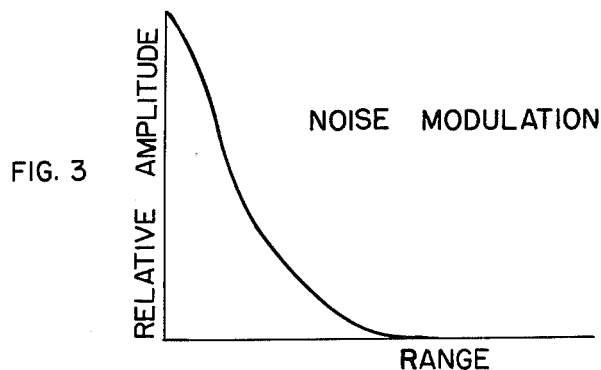
FIG. 3 is a diagram similar to FIG. 2 illustrating the relative amplitude of the response with respect to range of a noise modulated FM doppler fuze system.

The output from the low pass filter 17 will provide a trigger signal when it reaches a suitable level on the relative amplitude curve illustrated in FIG. 3 for firing the detonation circuit 18 of the fuze.

If desired a fixed delay (not shown) could be inserted in one of the channels feeding the mixer 15 to make the fuze signal peak at a prescribed range.

THEORY

Figure 2:
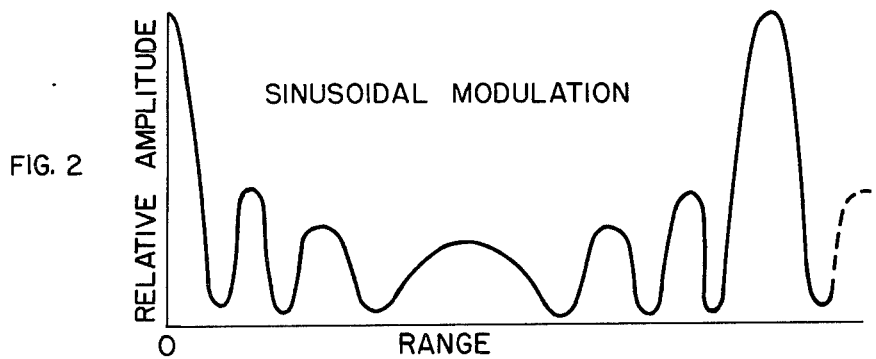
FIG. 2 is a diagram illustrating the relative amplitude of the response with respect to range of the prior art sinusoidal modulation FM fuze system.

The following explicit theory explains and supports the disclosed operation of the novel fuze system disclosed herein and clarifies its novel functions and distinctions over the previous sinusoidal modulation which provides a periodic range response, as shown in FIG. 2, which is ambiguous and undesirable under many conditions of use.

A radio frequency carrier $\omega_o$, frequency or phase modulated by random noise, may be expressed as $$V(t) = V_o \sin[\omega_o t + Dm(t)],$$

where $m(t)$ is the normalized random noise function, (with $\overline{m(t)} = 0$ and $\overline{|m(t)|^2} = 1$), and "D" is a scale factor denoting the absolute r.m.s. frequency deviation. The autocorrelation function is $$R(\tau) = \overline{V_o^2 \sin[\omega_o t + D \cdot m(t)] \sin[\omega_o(t-\tau) + D \cdot m(t-\tau)]} \qquad (1)$$

$$= \frac{V_o^2}{2} \overline{\cos[\omega_o \tau + D \cdot m(t) - D \cdot m(t-\tau)]} - \frac{V_o^2}{2} \overline{\cos[2\omega_o t - \omega_o \tau + D \cdot m(t) + D \cdot m(t-\tau)]}$$

The second term in equation (1) is a high frequency carrier with relatively small phase deviation and therefore has an average value of zero. The autocorrelation function is therefore just $$R(\tau) = \frac{V_o^2}{2} \overline{\cos[\omega_o \tau + D \cdot m(t) - D \cdot m(t-\tau)]} \qquad (2)$$

If the local and delayed carriers are applied to an envelope detector of the usual type, the detector output is $$KV_o \cos[\omega_o \tau + D \cdot m(t) - D \cdot m(t-\tau)] \quad (K << 1.0) \qquad (3)$$

in which $1/K$ is the attenuation due to the range and is assumed to be large. If the detector output is averaged by passing through a low pass filter, the autocorrelation function results. The nature of the output before averaging must be somewhat as depicted in FIG. 4 in which $\tau$ is assumed to increase linearly with time. The local carrier is represented by the large vector $V_o$ and the smaller return vector $K V_o$ for the condition $\tau = 0$. Both vectors must be regarded as undergoing random changes of angular velocity but at $\tau = 0$ their relative angular velocity is zero, i.e., for every random shift of phase angle in the local signal there is a corresponding shift in the phase angle of the return signal. As $\tau$ increases, this perfect correlation is not preserved. The envelope traces out doppler cycles which soon develop traces of jitter. As $\tau$ is increased further, all coherence of the vectors disappears and the envelope undergoes a transition from doppler signal to random noise. If the lowest noise frequencies are high compared to the doppler frequency, a filter tuned to the doppler frequency will display a doppler output when $\tau$ is small and zero output when $\tau$ is large.

The exact nature of the transition from coherence to noise was investigated and it has been shown that under certain conditions the power spectrum of a carrier, frequency modulated with band limited random noise, is given by a normal distribution about the carrier, i.e., $$S(\omega) = A e^{-\frac{(\omega - \omega_o)^2}{8\pi D^2}} \qquad (4)$$

Where A is a constant, $\omega$, $\omega_o$, and D retain their meaning from equation (1). Using an equation from the Weiner-Kintchine theorem which relates the smoothed power spectrum of $f(t)$ with the autocorrelation function:

$$R(\tau) = \int_0^\infty S(\omega) \cos \omega\tau \, d\omega =$$

$$A \int_0^\infty e^{-\frac{(\omega - \omega_o)^2}{8\pi D^2}} \cos \omega\tau \, d\omega.$$

Substituting $x = \omega - \omega_o$ $$R(\tau) = A \cos \omega_o \tau \int_{-\omega_o}^{+\infty} e^{-\frac{x^2}{8\pi D^2}} \cos x\tau \, dx + \qquad (6)$$

$$A \sin \omega_o \tau \int_{-\omega_o}^{+\infty} e^{-\frac{x^2}{8\pi D^2}} \sin x\tau \, dx$$

Since always, $\omega_o >> 2\pi D$, then, because of the extremely rapid convergence of the exponential, integration from $-\omega_o$ to $+\infty$ is almost exactly equivalent to integration from $-\infty$ to $+\infty$ (or from $-\omega_o$ to $+\omega_o$). Since the second integral is an odd function, its integral is zero and $$R(\tau) = 2A \cos \omega_o \tau \int_0^\infty e^{-\frac{x^2}{8\pi D^2}} \cos x\tau \, dx = \qquad (7)$$

$$A \pi D \sqrt{2} \cos \omega_o \tau \, e^{-2\pi \tau^2 D^2}$$

From equation (5)

$$R(\tau) = \frac{V_o^2}{2} \cos \omega_o \tau \overline{\cos[D \cdot m(t) - D \cdot m(t-\tau)]}$$

(considering that $\sin[D \cdot m(t) - D \cdot m(t-\tau)]$ must be zero or very small.

Figure 5:
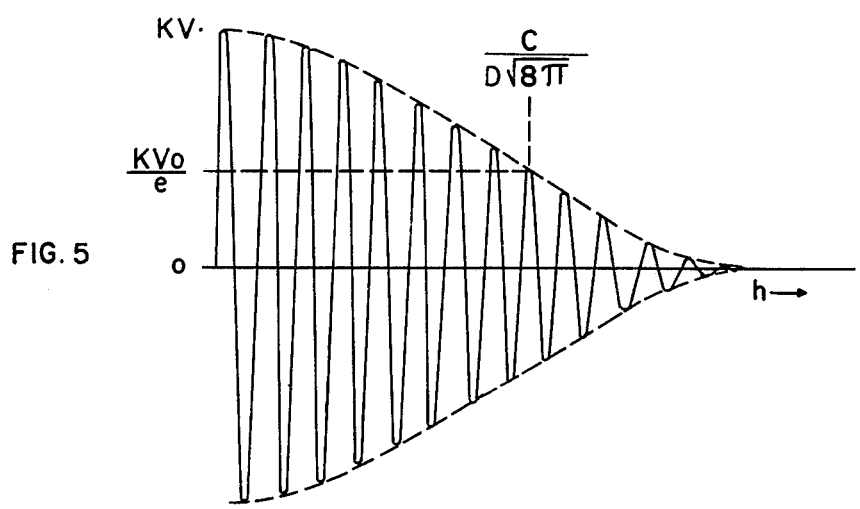
FIG. 5 is another diagram illustrating the useful fuze signal which is the doppler frequency having an amplitude proportional to a Gaussian function of the range.

We therefore expect the range law to be $$F(d) = QKV_o \cos \frac{4\pi d}{\lambda_o} e^{-\frac{8\pi d^2 D^2}{C^2}}$$

Where Q is a constant determined by other system parameters, $\lambda_o$ is the carrier center wavelength, and C is the velocity of light. The useful fuze signal is the doppler frequency which has an amplitude proportional to a Gaussian function of the range as shown in FIG. 5. This range law contains no ambiguities (i.e., decreases monotonically) and it provides an exceedingly sharp cutoff. For example, if $d_1^2 = C^2/8\pi D^2$, then $$F(d_1) = KV_o/e,$$

and at twice this distance $F(2d_1) = KV_o/e^4$; therefore, $F(d_1)/F(d_2) = e^3 \approx 20$.

This is from consideration of the Gaussian curve alone. The factor K is also range dependent in the form K $1/d^N$ and augments the rate of range cutoff.

It is interesting to note that at large ranges, the output vanishes regardless of the "space attenuation" for the exponential will always overwhelm terms like $h^{-N}$.

It is necessary to state the conditions for which the theory holds. These are:

1. The rms deviation is large compared with the noise bandwidth. This is an assumption necessary for the validity of equation 4.

2. The lowest noise frequency components are large compared with the upper range of expected oppler frequencies. This is necessary if the doppler filter is to be an effective noise averaging device.

It will be apparent that only one antenna could be used for both transmitting and receiving, however, the system disclosed herein reduces microphonics and is considered more desirable.

While it has been indicated that the particular noise band passed through the filter 12 may cover a wide range and be of various widths, the optimum width and location of the band must be determined experimentally for any specific fuze system. However, in general, the noise band should be located somewhere between the band of expected doppler frequencies and a value $2\pi D$, where D is the scale factor denoting the absolute rms frequency deviation which in turn is determined by the desired range cutoff. While the present system is intended for use in the microwave region it will be apparent that the system will be operative at relatively low frequencies in the vhf or uhf region. However, each region will probably have certain inherent advantages in a particular fuze system.

It will be apparent from examination of the diagram in FIG. 2 illustrating the range response from the sinusoidal modulation type of fuze system that a series of signals will be received at different ranges which are ambiguous and do not provide a sharp range cutoff. While the diagrams of FIGS. 2 and 3 will both be effected by attenuation of the signal, the sinusoidal type of modulation will obviously provide much less desirable signals for.

The effect of attenuation of the signal response will further increase the slope of the curve in FIG. 3 and therefore provides a more rapid range cutoff which will closely approach the ideal rectangular range law which at the present time appears to be unobtainable in a workable system.

Obviously many modifications and variations of the present invention are possible in the light of the above teachings. It is therefore to be understood that within the scope of the appended claims the invention may be practiced otherwise than specifically described.

What is claimed is:

1. An FM doppler fuze system comprising means for transmitting a signal having a carrier frequency modulated by a band of random noise, means for mixing the transmitted signal with a return echo signal modified by the doppler effect of the relative movement between the fuze and a target, and means for deriving an output adapted to actuate the fuze from the low frequency doppler portion of the output from said mixing means.

2. The fuze system comprising a white noise source adapted to produce a uniform spectrum of random frequency signals, a band pass filter operatively associated with said white noise source and adapted to pass a band of said noise, means for modulating a carrier frequency with said band of noise and transmitting a signal in the direction of the target, means adapted to mix a portion of said transmitted signal and a return echo signal from a target, and filter means adapted to pass the low frequency band from the output of said mixture for actuating a fuze.

3. A fuze system comprising a white noise source adapted to produce a uniform spectrum of random frequency signals, a band pass filter operatively associated with said white noise source and adapted to pass a sharply defined band of said noise, means including an FM modulator and transmitter for modulating a carrier frequency with said band of noise and transmitting a signal in the direction of the target, means including a cosine law mixer adapted to receive a portion of said transmitter signal and a return echo signal from a target, and means including a low pass filter adapted to pass the band of expected doppler frequencies from the output of said mixer for actuating a fuze.

4. A fuze system comprising a white noise source adapted to produce a uniform spectrum of random frequency signals, a band pass filter operatively associated with said white noise source and adapted to pass a sharply defined band of said noise, means including an FM modulator and transmitter for modulating a carrier frequency with said band of noise and transmitting a signal in the direction of the target having a Gaussian power spectrum, means including a cosine law mixer adapted to receive a portion of said transmitted signal and a return echo signal from a target, and means including a low pass filter adapted to pass the low frequency portion of the output of said mixer which is proportional to the autocorrelation function of the transmitted signal or the Fourier transform of the Gaussian power spectrum.

5. A fuze system comprising a white noise source adapted to produce a uniform spectrum of random frequency signals, a band pass filter operatively associated with said white noise source and adapted to pass a sharply defined band of said noise, means including an FM modulator and transmitter for modulating a carrier frequency with said band of noise and transmitting a signal in the direction of the target having a Gaussian power spectrum, means including a cosine law mixer adapted to receive a portion of said transmitted signal and a return echo signal from a target and derive an output therefrom, means including a low pass filter adapted to pass the band of expected doppler frequencies from the output of said mixer and derive an output proportional to the autocorrelation function of the power spectrum, and means including a detonation circuit adapted to utilize said last output for actuating a fuze.

* * * * *